(12) United States Patent
Harada et al.

(10) Patent No.: US 11,384,188 B2
(45) Date of Patent: Jul. 12, 2022

(54) AQUEOUS RESIN DISPERSION

(71) Applicant: Mitsubishi Chemical Corporation, Chiyoda-ku (JP)

(72) Inventors: Akira Harada, Chiyoda-ku (JP); Shinsuke Haraguchi, Chiyoda-ku (JP); Motomi Tanaka, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 237 days.

(21) Appl. No.: 16/211,386

(22) Filed: Dec. 6, 2018

(65) Prior Publication Data

US 2019/0106591 A1    Apr. 11, 2019

Related U.S. Application Data

(63) Continuation of application No. PCT/JP2017/021195, filed on Jun. 7, 2017.

(30) Foreign Application Priority Data

Jun. 8, 2016  (JP) .............................. JP2016-114142
Jun. 21, 2016 (JP) .............................. JP2016-122702

(51) Int. Cl.
| | | |
|---|---|---|
| *C09D 151/06* | (2006.01) | |
| *C09D 7/20* | (2018.01) | |
| *C09D 5/02* | (2006.01) | |
| *C09D 123/00* | (2006.01) | |
| *C08F 255/00* | (2006.01) | |
| *C08F 255/02* | (2006.01) | |
| *C09D 133/06* | (2006.01) | |

(52) U.S. Cl.
CPC ........ *C08F 255/00* (2013.01); *C08F 255/023* (2013.01); *C09D 5/02* (2013.01); *C09D 7/20* (2018.01); *C09D 123/00* (2013.01); *C09D 133/066* (2013.01); *C09D 151/06* (2013.01)

(58) Field of Classification Search
CPC ........ C09D 133/066; C09D 7/20; C09D 5/02; C09D 123/00; C09D 151/06; C08F 255/00; C08F 255/023
USPC ........................................................ 524/458
See application file for complete search history.

(56) References Cited

U.S. PATENT DOCUMENTS

| | | |
|---|---|---|
| 5,728,767 A | 3/1998 | Kanetou et al. |
| 2003/0162887 A1 | 8/2003 | Mitsui et al. |
| 2008/0287534 A1 | 11/2008 | Kashihara |

FOREIGN PATENT DOCUMENTS

| | | | |
|---|---|---|---|
| EP | 0 767 186 A1 | 4/1997 | |
| EP | 1 364 977 A1 | 11/2003 | |
| EP | 1 772 488 A1 | 4/2007 | |
| JP | 58037061 A1 * | 3/1983 | ........... B29C 33/302 |
| JP | 6-256671 | 9/1994 | |
| JP | 11-147975 | 6/1999 | |
| JP | 2000-355655 | 12/2000 | |
| JP | 2002-308921 | 10/2002 | |
| JP | 2005-042031 | 2/2005 | |
| JP | 2006-36920 | 2/2006 | |
| JP | 2008-24755 | 2/2008 | |
| JP | 2011-46777 | 3/2011 | |
| JP | 2011-246572 | 12/2011 | |
| JP | 2011-246616 | 12/2011 | |
| JP | 2013-72018 | 4/2013 | |
| JP | 2013-133417 | 7/2013 | |
| JP | 2013-216834 | 10/2013 | |
| JP | 2018-104620 A | 7/2018 | |
| WO | WO 2016/072321 A1 | 5/2016 | |

OTHER PUBLICATIONS

Translation to JP 58037061 A, published Mar. 4, 1983; (Year: 1983).*

* cited by examiner

*Primary Examiner* — Kelechi C Egwim

(74) *Attorney, Agent, or Firm* — Oblon, McClelland, Maier & Neustadt, L.L.P.

(57) ABSTRACT

The invention provides an aqueous resin dispersion which can form a coating film excellent in adhesion to a polypropylene base material, and water resistance, and has excellent particle stability. Specifically, it provides an aqueous resin dispersion in which an olefin polymer (A), and a polymer (C) containing a constituent unit derived from a radically polymerizable monomer (B) represented by the following general formula (1) are dispersed in an aqueous medium. (In the general formula (1), R is a hydrogen atom or a methyl group, and X is a straight chain or branched alkylene group having 3 to 5 carbon atoms; and n is an integer of 1 to 20.)

8 Claims, No Drawings

AQUEOUS RESIN DISPERSION

TECHNICAL FIELD

The present invention relates to an aqueous resin dispersion.

BACKGROUND ART

Since polyolefins such as a propylene polymer and a propylene/α-olefin copolymer are inexpensive and are excellent in mechanical properties, heat resistance, chemical resistance, water resistance, and the like, they are used in a wide range of fields. However, since polyolefins have low polarity due to lack of a polar group in the molecule, coating or bonding of the same is often difficult, and therefore mitigation of this drawback has been desired.

For this reason, various studies, such as a method of chemically treating the surface of a molded article of polyolefin with a chemical agent, a method of oxidizing the surface of a molded article by a corona discharge treatment, a plasma treatment, a flame treatment, or the like have been conducted. However, these methods not only require special equipment, but also their improvement effects on coatability or adhesiveness have been not adequate.

In addition, as a devise for imparting good coatability or adhesiveness to a polyolefin, for example, a propylene-based polymer, by a relatively simple method, a method of coating the surface of a molded article of polyolefin with a modified polyolefin, such as a so-called chlorinated polypropylene and acid-modified propylene/α-olefin copolymer, and an acid-modified chlorinated polypropylene, as a surface treating agent, an adhesive, a coating material, or the like, has been known. The modified polyolefin is usually applied in the form of a solution in an organic solvent, or an aqueous dispersion. From the viewpoints of safety and hygiene, as well as environmental pollution, an aqueous dispersion is preferably used.

In order to improve the performance as a coating material and the storage stability, an aqueous resin dispersion in which a modified polyolefin and a radically polymerized polymer are combined has been developed. For example, in Patent Literature 1 and 2, a method of emulsion polymerization of a mixture of an aqueous resin dispersion of a graft copolymer in which a hydrophilic polymer is grafted on to an olefinic polymer, and a vinyl type monomer containing a surfactant, is described. In Patent Literature 3 a method of obtaining an aqueous resin composition by dissolving a modified polyolefin and a surfactant in a vinyl type monomer, dispersing the solution in water, and then carrying out emulsion polymerization thereof, is described. In Patent Literature 4 and 5, a method of obtaining an aqueous resin composition by emulsifying an olefinic resin using a surfactant derived from a vinyl type monomer is described.

CITATION LIST

Patent Literature

Patent Literature 1: JP2011-46777A
Patent Literature 2: JP2013-133417A
Patent Literature 3: JP2006-036920A
Patent Literature 4: JP2011-246616A
Patent Literature 5: JP2011-246572A

SUMMARY OF INVENTION

Technical Problem

However, by the method described in Patent Literature 1 and 5, the radically polymerized polymer obtained from a vinyl monomer inhibited adhesion to a polypropylene-based base material, and the adhesion to a polypropylene base material was insufficient.

An object of the present invention is to provide an aqueous resin dispersion capable of forming a coating film excellent in adhesion to a polypropylene base material.

Solution to Problem

The present invention is an aqueous resin dispersion (D) in which an olefin polymer (A), and a polymer (C) containing a constituent unit derived from a radically polymerizable monomer (B) represented by the following general formula (1) are dispersed in an aqueous medium.

[Formula 1]

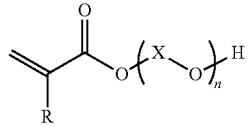

(1)

In the general formula (1), R is a hydrogen atom or a methyl group, and X is a straight chain or branched alkylene group having 3 to 5 carbon atoms. n is an integer of 1 to 20.

Further, the present invention is an aqueous olefinic resin dispersion (ID) in which an olefin polymer (A) and a polymer (IC) containing a constituent unit derived from a radically polymerizable monomer (IB) having an acidic group are dispersed in an aqueous medium, wherein an acid value of the polymer (IC) is from 1 to 9 mg KOH/g, and wherein contents of the olefin polymer (A) and the polymer (IC) in the aqueous olefinic resin dispersion (ID) in terms of mass ratio are: Olefin polymer (A):Polymer (IC)=10:90 to 90:10.

Advantageous Effects of Invention

According to the present invention, it is possible to provide an aqueous resin dispersion which can form a coating film excellent in adhesion to a polypropylene base material.

DESCRIPTION OF EMBODIMENTS

An aqueous resin dispersion (D) of the present invention is a dispersion in which an olefin polymer (A) and a polymer (C) containing a constituent unit derived from a radically polymerizable monomer (B) represented by the general formula (1) are dispersed in an aqueous medium.

An aqueous resin dispersion (ID) of the present invention is an aqueous olefinic resin dispersion (ID) in which an olefin polymer (A) and a polymer (IC) containing a constituent unit derived from a radically polymerizable monomer (IB) having an acidic group are dispersed in an aqueous medium (hereinafter also simply referred to as "aqueous resin dispersion (ID)"), wherein an acid value of the polymer (IC) is from 1 to 9 mg KOH/g, and wherein contents of the olefin polymer (A) and the polymer (IC) in the aqueous olefinic resin dispersion (ID) in terms of mass ratio are: Olefin polymer (A):Polymer (IC)=10:90 to 90:10.

<Olefin Polymer (A)>

An olefin polymer (A) means a polymer containing an olefin as a main constituent unit, and includes an olefinic polymer (A1) (hereinafter, also referred to as "polymer (A1)"), such as a homopolymer and a copolymer of an olefin.

[Olefinic Polymer (A1)]

Examples of the olefinic polymer (A1) (polymer (A1)) include an olefinic polymer not having a reactive group (A11) (hereinafter also referred to as "polymer (A11)"), and a modified olefinic polymer having a reactive group (A12) (hereinafter also referred to as "polymer (A12)").

Examples of a preferable embodiment of the polymer (A1) include a propylene-based polymer satisfying the following (1) to (3).

(1) A polymer is composed of a constituent unit which is an olefin monomer having 4 or less carbon atoms.

(2) A polymer has a propylene content of 50 mol % or more. The propylene content is more preferably 60 mol % or more, and further preferably 70 mol % or more.

(3) A polymer has a melting point (Tm) of 125° C. or less. The Tm is more preferably 100° C. or less, and further preferably 90° C. or less. Furthermore, the Tm is preferably 60° C. or more.

(Olefinic Polymer not having Reactive Group (A11))

As the olefinic polymer not having a reactive group (A11) (polymer (A11)), various known olefinic polymers and olefinic copolymers can be used. Specific examples thereof may include, but not limited to, the following polyolefins. A homopolymer of ethylene, or propylene; a copolymer of ethylene and propylene; a copolymer of ethylene and/or propylene and another comonomer (for example, an α-olefin comonomer having 4 or more carbon atoms, such as butene-1, pentene-1, hexene-1, heptene-1, octene-1, cyclopentene, cyclohexene, and norbornene); a copolymer composed of two or more kinds selected from the above-listed other comonomers; a copolymer of an α-olefin monomer having 2 or more carbon atoms with a comonomer such as vinyl acetate, an acrylic acid ester, and a methacrylic acid ester; a copolymer of an α-olefin monomer having 2 or more carbon atoms with a comonomer such as an aromatic vinyl monomer, or a hydrogenated product thereof; and a conjugated diene block copolymer, or a hydrogenated product thereof. The simple term of a "copolymer" may mean herein either of a random copolymer or a block copolymer.

The α-olefin monomer having 2 or more carbon atoms is preferably an α-olefin monomer having 2 to 4 carbon atoms. Further, the polymer (A11) may be a chlorinated polyolefin obtained by chlorinating the above polyolefin. In that case, the degree of chlorination of the chlorinated polyolefin is usually 5 mass % or more, and preferably 10 mass % or more. The degree of chlorination is usually 40 mass % or less, and preferably 30 mass % or less.

Specific examples of the polymer (A11) include polyethylene, polypropylene, an ethylene/butene copolymer, an ethylene/propylene copolymer, a propylene/butene copolymer, a propylene/hexene copolymer, chlorinated polyethylene, chlorinated polypropylene, a chlorinated ethylene/propylene copolymer, a chlorinated propylene/butene copolymer, an ethylene/vinyl acetate copolymer, a hydrogenated product of a styrene/butadiene/styrene block copolymer (SEBS), and a hydrogenated product of a styrene/isoprene/styrene block copolymer (SEPS). These polymers (A11) may be used singly, or in combination of two or more kinds thereof.

The polymer (A11) is preferably a propylene homopolymer, or a copolymer of propylene and an α-olefin other than propylene, which may be chlorinated. The polymer (A11) is more preferably a propylene homopolymer, an ethylene/propylene copolymer, a propylene/butene copolymer, a chlorinated polypropylene, a chlorinated ethylene/propylene copolymer, or a chlorinated propylene/butene copolymer. Further, the polymer (A11) is further preferably a polymer not containing a chlorine atom; and particularly preferable is a propylene homopolymer, an ethylene/propylene copolymer, a propylene/butene copolymer, or an ethylene/propylene/butene copolymer, which does not contain a chlorine atom.

Further, the polymer (A11) is preferably a propylene-based polymer containing propylene as its constituent unit. The content of propylene in the propylene-based polymer is preferably 50 mol % or more, more preferably 60 mol % or more, and further preferably 70 mol % or more. Normally, as the content of propylene increases, the adhesion to a polypropylene base material tends to increase.

The weight average molecular weight (Mw) of the polymer (A11) measured using GPC (Gel Permeation Chromatography), and converted with a calibration curve for each polyolefin is preferably from 5,000 to 500,000. The lower limit value is more preferably 10,000, further preferably 20,000, and particularly preferably 30,000. The upper limit value is more preferably 300,000. As the Mw becomes higher beyond 5,000, the degree of stickiness decreases and the adhesion to a base material tends to increase. Also, as Mw becomes lower below 500,000, the viscosity decreases, and the preparation of an aqueous resin dispersion tends to become easier. Meanwhile, a GPC measurement is carried out by a heretofore known method using a commercially available apparatus with a solvent such as o-dichlorobenzene.

The melting point (Tm) of the polymer (A11) is preferably 125° C. or less. The lower limit value is preferably 60° C. or more. A more preferable upper limit value is 100° C. or less, and a further preferable value is 90° C. or less. In a case where the melting point is 60° C. or more, resin stickiness does not appear, and handling becomes easy when used as a coating material. Further, the melting point is preferably 125° C. or less, because drying and baking do not require a high temperature.

There is no particular restriction on a method for producing the polymer (A11), insofar as it is a method capable of producing a polymer satisfying the requirements of the present invention, and any production method may be used. Examples of the production method include radical polymerization, cationic polymerization, anionic polymerization, and coordination polymerization. These may be kind of living polymerization.

In the case of coordination polymerization, examples thereof include a polymerization method with a Ziegler-Natta catalyst, and a polymerization method with a single site catalyst. A preferable production method is for example a production method using a single site catalyst. The reason for this is, for example, that a single site catalyst can generally sharpen a molecular weight distribution or a stereoregularity distribution by designing the ligand. As the single site catalyst, for example, a metallocene catalyst, or a Brookhart catalyst can be used. As the metallocene catalyst, those having a symmetry type, such as C1 symmetry type, C2 symmetry type, C2V symmetry type, and CS symmetry type, are known. In the present invention, a metallocene catalyst with an appropriate symmetry type may be selected for use corresponding to the stereoregularity of a polyolefin to be polymerized.

The polymerization may be performed in any form such as solution polymerization, slurry polymerization, bulk polymerization, gas phase polymerization, or the like. In the case of solution polymerization or slurry polymerization, examples of a solvent include an aromatic hydrocarbon, such as toluene, and xylene; an aliphatic hydrocarbon, such as hexane, heptane and octane; an alicyclic hydrocarbon, such as cyclohexane, and methylcyclohexane; a halogenated hydrocarbon; an ester; a ketone; and an ether. Among these, an aromatic hydrocarbon, an aliphatic hydrocarbon, and an alicyclic hydrocarbon are preferable, and toluene, xylene, heptane, and cyclohexane are more preferable. These may be used singly, or in combination of two or more kinds thereof. The polymer (A11) may be in a straight chain or branched form.

(Modified Olefinic Polymer having Reactive Group (A12))

Examples of the modified olefinic polymer having a reactive group (A12) (polymer (A12)) include a copolymer (A12a) obtained by copolymerizing an olefin and an unsaturated compound having a reactive group at the time of polymerization, and a graft polymer (A12b) obtained by graft polymerization of a radically polymerizable unsaturated compound having a reactive group to an olefinic polymer.

The copolymer (A12a) is obtained by copolymerizing an olefin with an unsaturated compound having a reactive group, and is a copolymer in which main chain the unsaturated compound having a reactive group is inserted. Example thereof include a copolymer obtained by copolymerizing an α-olefin, such as ethylene, propylene, and butene with an α,β-unsaturated carboxylic acid or anhydride, such as acrylic acid, and maleic anhydride. Specific examples of the copolymer (A12a) include an ethylene/acrylic acid copolymer, and an ethylene/acrylic ester/maleic anhydride copolymer. These may be used singly, or in combination of two or more kinds thereof. As a method for producing the copolymer (A12a), the same method as described for the polymer (A11) can be used.

The graft polymer (A12b) is obtained by graft polymerization of a radically polymerizable unsaturated compound having a reactive group to an olefinic polymer. As the olefinic polymer, the above polymer (A11) may be used. Examples of the reactive group in the radically polymerizable unsaturated compound having a reactive group include a carboxyl group and its anhydride, an amino group, an epoxy group, an isocyanate group, a sulfonyl group, and a hydroxy group. Among these, a carboxyl group and its anhydride are preferable. Examples of the radically polymerizable unsaturated compound having a reactive group include (meth)acrylic acid, fumaric acid, maleic acid or its anhydride, itaconic acid or its anhydride, and crotonic acid. These may be used singly, or in combination of two or more kinds thereof. "(Meth)acrylic acid" is a collective term for acrylic acid and methacrylic acid, and this applies mutatis mutandis also to analogs.

Specific examples of the graft polymer (A12b) include maleic anhydride-modified polypropylene and its chlorinated product, a maleic anhydride-modified ethylene/propylene copolymer and its chlorinated product, a maleic anhydride-modified propylene/butene copolymer, an acrylic acid-modified polypropylene and its chlorinated product, an acrylic acid-modified ethylene/propylene copolymer and its chlorinated product, and an acrylic acid-modified propylene/butene copolymer. These may be used singly, or in combination of two or more kinds thereof.

As a radical polymerization initiator used for the graft polymerization, appropriate one may be selected from conventional radical polymerization initiators and used, and examples thereof may include an organic peroxide and azonitrile. Examples of the organic peroxide may include a peroxyketal, such as di(t-butylperoxy)cyclohexane; a hydroperoxide, such as cumene hydroperoxide; a dialkyl peroxide, such as di(t-butyl) peroxide; a diacyl peroxide, such as benzoyl peroxide; and a peroxyester, such as t-butylperoxy isopropyl monocarbonate. Examples of the azonitrile include azobisbutyronitrile, and azobisisopropylnitrile. Among these, benzoyl peroxide and t-butylperoxy isopropyl monocarbonate are preferable. These may be used singly, or in combination of two or more kinds thereof.

The ratio of a radical polymerization initiator to a graft copolymerization portion of the graft polymer (A12b) used is usually in the following range: Radical polymerization initiator:Graft copolymerization portion=1:100 to 2:1 (molar ratio), and it is preferably in a range of 1:20 to 1:1. The reaction temperature of the graft polymerization is usually 50° C. or more, and preferably in a range of 80 to 200° C. The reaction time of the graft polymerization is usually about 2 to 20 hours.

There is no particular restriction on the method for producing a graft polymer (A12b), and any production method may be used insofar as a polymer satisfying the requirements of the present invention can be produced. Examples of the production method include a production method by which a reactant solution is stirred with heating, a production method by which a molten reactant is agitated with heating without a solvent, and a production method by which a reactant is kneaded with heating in an extruder. As the solvent for production in a solution, the same solvents presented as examples in the method for producing the polymer (A11) may be used.

The content of a reactive group in the graft polymer (A12b) obtained by graft polymerization of the radically polymerizable unsaturated compound having a reactive group to an olefinic polymer is preferably in a range of 0.01 to 1 mmol per 1 g of the olefinic polymer, namely 0.01 to 1 mmol/g. The lower limit value is more preferably 0.05 mmol/g, and further preferably 0.1 mmol/g. The upper limit value is more preferably 0.5 mmol/g, and further preferably 0.3 mmol/g. As the content of a reactive group increases beyond 0.01 mmol/g, the dispersed particle diameter tends to decrease because the hydrophilicity increases. Further, as the content of a reactive group decreases below 1 mmol/g, the adhesion to a polypropylene base material tends to increase.

In a case where the reactive group in the graft polymer (A12b) is an acidic group, such as a carboxyl group or its anhydride, and a sulfonyl group, the mechanical stability of an aqueous resin dispersion (D) tends to be improved by neutralizing the acidic group with a basic compound. Examples of the basic compound include an inorganic base, such as sodium hydroxide, potassium hydroxide and ammonia; and an organic base, such as triethylamine, diethylamine, ethanolamine, dimethylethanolamine, 2-methyl-2-aminopropanol, triethanolamine, morpholine, and pyridine. Although the neutralization rate by the basic compound is not particularly restricted within a range of 1 to 100 mol % insofar as the dispersibility in water is secured, it is preferably 50 mol % or more. When the neutralization rate is low, the dispersibility in water decreases.

In the present invention, an olefin polymer (A) may be used in the form of an aqueous resin dispersion. There is no particular restriction on the method for producing an aqueous resin dispersion, and examples thereof include a method by which a mixture of an olefin polymer (A), water, and a solvent other than water is prepared, and then the solvent is removed from the mixture to form a dispersion, and a method by which the polymer is melted at a temperature beyond the melting temperature of an olefin polymer (A), and water is added thereto to form a dispersion.

In addition, the aqueous resin dispersion of an olefin polymer (A) may be prepared by a method of dispersing the polymer by adding a surfactant, or by a method of dispersing the polymer using a graft copolymer obtained by grafting a water-soluble polymer to the olefin polymer. The latter is preferable because of superior water resistance.

Examples of the solvent other than water include methyl ethyl ketone, cyclohexanone, n-propanol, isopropanol, n-butanol, isobutanol, t-butanol, cyclohexanol, tetrahydrofuran, 2-methoxyethanol, 2-ethoxyethanol, 2-butoxyethanol, 2-methoxypropanol, and 2-ethoxypropanol. These may be used singly, or in combination of two or more kinds thereof.

Examples of such an aqueous resin dispersion of an olefin polymer (A) include SUPERCHLON® series (produced by Nippon Paper Industries Co., Ltd.), AUROREN® series (produced by Nippon Paper Industries Co., Ltd.), HARDLEN® series (produced by Toyobo Co., Ltd.), and APTOLOK® series (produced by Mitsubishi Chemical Corporation).

<Polymer (C)>

The polymer (C) contains a constituent unit derived from a radically polymerizable monomer (B).

[Radically Polymerizable Monomer (B)]

A radically polymerizable monomer (B) according to the present invention is represented by the following general formula (1). When a polymer (C) contains a constituent unit derived from the radically polymerizable monomer (B), the adhesion of an obtainable coating film to a polypropylene base material tends to be excellent.

[Formula 2]

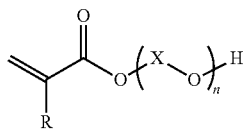

(1)

In the general formula (1), R is a hydrogen atom or a methyl group, and X is a straight chain or branched alkyl group having 3 to 5 carbon atoms. n is an integer of 1 to 20, and is preferably 1.

Examples of a radically polymerizable monomer (B) include 3-hydroxypropyl acrylate, 2-hydroxypropyl acrylate, 3-hydroxypropyl methacrylate, 2-hydroxypropyl methacrylate, 4-hydroxybutyl acrylate, 2-hydroxybutyl acrylate, 4-hydroxybutyl methacrylate, 2-hydroxybutyl methacrylate, poly(propylene glycol) acrylate, and poly(propylene glycol) methacrylate. Among these, 2-hydroxypropyl methacrylate, 2-hydroxypropyl acrylate, and 4-hydroxybutyl acrylate are preferable, because the adhesion to a polypropylene base material is excellent.

The hydroxyl value of a polymer (C) containing a constituent unit derived from a radically polymerizable monomer (B) is preferably from 1 to 200 mg KOH/g. The hydroxyl value is more preferably from 1 to 160 mg KOH/g, and further preferably from 1 to 100 mg KOH/g. When the hydroxyl value is 100 mg KOH/g or less, the adhesion to a polypropylene base material tends to be further improved. The hydroxyl value is calculated by the following formula.

Hydroxyl value(mg KOH/g)=($f$×M1/Mw/M2× [KOH]×1,000)

f: Number of hydroxy groups in monomer containing hydroxy group

[KOH]: Molecular weight of KOH

M1: Mass (g) of monomer containing hydroxy group

M2: Total mass (g) of polymer (C)

Mw: Molecular weight (number average molecular weight) of monomer containing hydroxy group The proportion of a constituent unit derived from a radically polymerizable monomer (B) contained in a polymer (C) is preferably from 0.01 to 50 mass %. The proportion is more preferably from 0.05 to 40 mass %, and further preferably from 0.1 to 30 mass %. When the proportion is 50 mass % or less, the adhesion to a polypropylene base material tends to be improved. In addition, when the proportion is 0.01 mass % or more, the water resistance tends to be improved.

A polymer (C) may contain in addition to the constituent unit derived from a radically polymerizable monomer (B) a constituent unit derived from a vinyl type monomer other than the radically polymerizable monomer (B). As such a vinyl type monomer, one having excellent polymerizability with the radically polymerizable monomer (B) is preferable. Examples of the vinyl type monomer include a (meth)acrylic monomer, such as (meth)acrylic acid, and a (meth)acrylic acid ester; an aromatic monomer, such as styrene and α-methyl styrene; an amide type monomer, such as (meth) acrylamide, and dimethyl (meth)acrylamide; (meth)acrylonitrile; vinyl acetate; vinyl propionate; and vinyl versatate.

Among these, from the viewpoints of weather resistance and solvent resistance, a (meth)acrylic monomer and an aromatic monomer are preferable. Specific examples of a (meth)acrylic monomer may include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, octyl (meth)acrylate, 2-ethylhexyl (meth)acrylate, nonyl (meth)acrylate, lauryl (meth)acrylate, and stearyl (meth)acrylate; a (meth)acrylic acid ester having an aryl group or aralkyl group having 6 to 12 carbon atoms, such as benzyl (meth)acrylate; dimethylaminoethyl (meth) acrylate, diethylaminoethyl (meth)acrylate, 2-aminoethyl (meth)acrylate, glycidyl (meth)acrylate, 2-methoxyethyl (meth)acrylate, 3-methoxypropyl (meth)acrylate, a poly (ethylene oxide) adduct of (meth)acrylic acid; a (meth) acrylic acid ester having an alkyl group having 1 to 20 carbon atoms and a fluorine atom, such as trifluoromethylmethyl (meth)acrylate, 2-trifluoromethylethyl (meth)acrylate, and 2-perfluoroethylethyl (meth)acrylate. Specific examples of an aromatic monomer include styrene, and α-methylstyrene.

Among these, isobutyl methacrylate, t-butyl methacrylate, butyl acrylate, styrene, and cyclohexyl methacrylate are preferable from the viewpoint of the adhesion to a polypropylene base material, and butyl acrylate is more preferable.

From the viewpoint of solvent stability of an aqueous resin dispersion (D), a polymer (C) may contain a constituent unit derived from a radically polymerizable monomer having an acidic group. Examples of the radically polymerizable monomer having an acidic group include a polymerizable monomer containing a carboxyl group, such as acrylic acid, methacrylic acid, maleic acid, maleic anhydride, and itaconic acid; a polymerizable monomer containing a phosphoric group, such as 2-methacryloyloxyethyl acid phosphate; and a polymerizable monomer containing a sulfonate, such as styrene sulfonate. Among these, from the viewpoint of polymerization stability, a polymerizable monomer containing a carboxyl group is preferable, and acrylic acid and methacrylic acid are more preferable. These may be used singly, or in combination of two or more kinds thereof.

<Polymer (IC)>

A polymer (IC) contains a constituent unit derived from a radically polymerizable monomer having an acidic group (IB). When a polymer (IC) contains a constituent unit derived from the radically polymerizable monomer (TB), the resultant aqueous resin dispersion (ID) tends to acquire excellent solvent stability.

[Radically Polymerizable Monomer having Acidic Group (IB)]

Examples of a radically polymerizable monomer having an acidic group (IB) (hereinafter also referred to simply as "radically polymerizable monomer (IB)") include a polymerizable monomer containing a carboxyl group, such as acrylic acid, methacrylic acid, maleic acid, maleic anhydride, and itaconic acid; a polymerizable monomer containing a phosphoric acid group, such as 2-methacryloyloxyethyl acid phosphate; and a polymerizable monomer containing a sulfonate, such as styrene sulfonate. Among these, from the viewpoint of polymerization stability, a polymerizable monomer containing a carboxyl group is preferable, and acrylic acid and methacrylic acid are more preferable. These may be used singly, or in combination of two or more kinds thereof.

In the present invention, the acid value of a polymer (IC) containing a constituent unit derived from a radically polymerizable monomer (IB) is from 1 to 9 mg KOH/g. The acid value is preferably from 1.5 to 8 mg KOH/g, and more preferably from 2 to 7 mg KOH/g. When the acid value is larger than 9 mg KOH/g, the adhesion to a polypropylene base material tends to decrease. Meanwhile, when the acid value is smaller than 1 mg KOH/g, the particle stability tends to decrease. In the present invention, the acid value of a polymer (IC) is a value calculated by the following formula.

Acid value (mg KOH/g)=($f \times M1/Mw/M2 \times$[KOH]$\times$1,000)

f: Number of acidic groups of radically polymerizable monomer (IB)
[KOH]: Molecular weight of KOH
M1: Mass (g) of radically polymerizable monomer (IB)
M2: Total mass (g) of polymer (IC)
Mw: Molecular weight (number average molecular weight) of radically polymerizable monomer (IB)

The content (solid component) of a radically polymerizable monomer (IB) in a polymer (IC) is preferably from 0.01 to 5 mass %. The content is more preferably from 0.01 to 3 mass %, and further preferably from 0.01 to 2 mass %. When the content of a radically polymerizable monomer (IB) is 5 mass % or less, the adhesion to a polypropylene base material adhesion tends to be improved. Further, when the content of a radically polymerizable monomer (IB) is 0.01 mass % or more, the particle stability tends to be improved.

A radically polymerizable monomer (IB) of the present invention may be neutralized with a basic compound before polymerization or after polymerization. From the viewpoint of production stability, neutralization with a basic compound after polymerization is preferable. Through neutralization, the mechanical stability or the solvent stability of the resultant polymer (IC) tends to be improved. Examples of the basic compound include an inorganic base, such as sodium hydroxide, potassium hydroxide, and ammonia; and an organic base, such as triethylamine, diethylamine, ethanolamine, dimethylethanolamine, 2-methyl-2-amino-propanol, triethanolamine, morpholine, and pyridine. Although the neutralization rate by the basic compound is not particularly restricted within a range of 1 to 100 mol % insofar as the mechanical stability and solvent stability are secured, it is preferably 50 mol % or more. When the neutralization rate is low, the mechanical stability and solvent stability may be decreased.

A polymer (IC) may include, in addition to a constituent unit derived from a radically polymerizable monomer (TB), a constituent unit derived from a vinyl type monomer other than the radically polymerizable monomer (TB). As such a vinyl type monomer, one having excellent polymerizability with a radically polymerizable monomer (IB) is preferable. Examples of the vinyl type monomer include a (meth)acrylic monomer, such as (meth)acrylic acid, and a (meth)acrylic acid ester; an aromatic monomer, such as styrene and α-methylstyrene; an amide type monomer, such as (meth)acrylamide, and dimethyl (meth)acrylamide; (meth)acrylonitrile; vinyl acetate; vinyl propionate; and vinyl versatate.

Among these, from the viewpoint of weather resistance and solvent resistance, a (meth)acrylic monomer, and an aromatic monomer are preferable. Specific examples of the (meth)acrylic monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, octyl (meth)acrylate, 2-ethylhexyl (meth)acrylate, nonyl (meth)acrylate, lauryl (meth)acrylate, stearyl (meth)acrylate; a (meth)acrylate ester having an aryl group or aralkyl group having 6 to 12 carbon atoms, such as benzyl (meth)acrylate; dimethylaminoethyl (meth)acrylate, diethylaminoethyl (meth)acrylate, 2-aminoethyl (meth)acrylate, glycidyl (meth)acrylate, 2-methoxyethyl (meth)acrylate, 3-methoxypropyl (meth)acrylate, a poly(ethylene oxide) adduct of (meth)acrylic acid; a (meth)acrylate ester having an alkyl group having 1 to 20 carbon atoms and a fluorine atom, such as trifluoromethylmethyl (meth)acrylate, 2-trifluoromethylethyl (meth)acrylate, and 2-perfluoroethylethyl (meth)acrylate. Specific examples of an aromatic monomer include styrene, and α-methyl styrene.

Among these, isobutyl methacrylate, t-butyl methacrylate, butyl acrylate, cyclohexyl methacrylate, and styrene are preferable from the viewpoint of adhesion to a polypropylene base material, and butyl acrylate is more preferable.

A polymer (IC) preferably contains a vinyl type monomer having a hydroxy group, because the coating film performance is improved, when a coating composition is prepared by mixing an aqueous resin dispersion, a melamine resin, and a crosslinking agent such as an isocyanate. Examples of the vinyl type monomer having a hydroxy group include 2-hydroxyethyl (meth)acrylate, 2-hydroxypropyl (meth)acrylate, and 4-hydroxybutyl (meth)acrylate. The content (solid component) of the vinyl type monomer having a hydroxy group in the polymer (IC) is preferably from 0.01 to 50 mass %.

<Aqueous Resin Dispersion (D)>

In the present invention, an aqueous resin dispersion (D) means a resin dispersion in which an olefin polymer (A) and a polymer (C) are dispersed in an aqueous medium.

In an aqueous resin dispersion (D), the olefin polymer (A) and the polymer (C) may be dispersed as separate particles, or the olefin polymer (A) and the polymer (C) may be dispersed as particles containing both. From the viewpoint of the stability of the aqueous resin dispersion, the latter is preferable.

The particle structure of an aqueous resin dispersion (D) can be observed by preparing an ultrathin section by a common gel embedding method, staining it with $RuO_4$, and observing it with a transmission electron microscope.

The aqueous medium contains water and/or a solvent other than water. Examples of a solvent other than water may include those listed for the aqueous resin dispersion of the olefin polymer (A).

The ratio (solid component, (C)/(A)) of the polymer (C) and the olefinic polymer (A) contained in an aqueous resin dispersion (D) is preferably from 0.5 to 2. Within this range, as the ratio increases, an aqueous resin dispersion (D) can be produced more stably, and the storage stability of the aqueous resin dispersion (D) is improved. Meanwhile, within the above range, as the ratio decreases, the initial adhesion of a coating film is improved.

To an aqueous resin dispersion (D), a surfactant may be added for purpose of improving the storage stability. As the surfactant, various anionic, cationic, or nonionic surfactants, or polymeric surfactants can be used. Furthermore, a so-called reactive surfactant having an ethylenic unsaturated bond in the surfactant component can also be used. Among these, from the viewpoint of improving the storage stability of the resultant aqueous resin dispersion (D), it is preferable to use an anionic surfactant. There is no particular restriction on the anionic surfactant, and for example ADEKA REASOAP SR (trade name, produced by Adeka Corporation), which is a reactive surfactant, and NEOCOL SW-C (trade name, produced by Dai-Ichi Kogyo Seiyaku Co., Ltd.), which is a nonreactive surfactant, can be used.

The surfactant (solid component) is preferably contained at a proportion of 3 parts by mass or less with respect to 100 parts by mass (solid component) of a polymer (C), and more preferably 2 parts by mass or less. When the proportion of the contained surfactant is 3 parts by mass or less, the storage stability of an aqueous resin dispersion (D) is improved. In this case, the stability when used for a coating composition can be maintained without impairing the water resistance.

[Method for Producing Aqueous Resin Dispersion (D)]

There is no particular restriction on the method for producing an aqueous resin dispersion (D) according to the present invention, and examples thereof include a method by which a raw material monomer for a polymer (C) is polymerized in an aqueous resin dispersion of an olefinic polymer (A), and a method by which an olefinic polymer (A) and a raw material monomer for a polymer (C) are dissolved to form an aqueous resin dispersion, and then polymerized. From the viewpoint of the polymerizability of the raw material monomer, the former method is preferable.

Further, as for a method for producing an aqueous resin dispersion (D), all-in polymerization and/or drop-wise polymerization may be applied, unless advantageous effects of the present invention are impaired. Here, all-in polymerization is a method by which the entire amount of a monomer is charged at one time and polymerized. Meanwhile, drop-wise polymerization is a method by which a monomer is supplied dropwise and polymerized. From the viewpoints of the polymerization stability and adhesion to a propylene base material, the all-in polymerization is preferable. The all-in polymerization may be carried out for example by a process where an aqueous resin dispersion of an olefinic polymer (A) and a radically polymerizable monomer (B), which is a raw material for a polymer (C) having 0.5 to 2 times the mass of the olefinic polymer (A), are mixed, and then radically polymerized by an initiator. The drop-wise polymerization may be carried out, for example, by drop-wise addition of a radically polymerizable monomer (B), which is a raw material for a polymer (C), into an olefinic polymer (A) in performing radical polymerization.

As an initiator to be used in a polymerization reaction, those generally used for radical polymerization may be used. Specific examples thereof include a persulfate, such as potassium persulfate, sodium persulfate, and ammonium persulfate; an oil-soluble azo compound, such as azobis (isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), and 2-phenylazo-4-methoxy-2,4-dimethylvaleronitrile; an water-soluble azo compound, such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-yl)propane] and salts thereof, 2,2'-azobis[2-(2-imidazolin-2-yl)propane] and salts thereof, 2,2'-azobis{2-[1-(2-hydroxyethyl)-2-imidazolin-2-yl]propane} and salts thereof, 2,2'-azobis(2-methylpropionamidine) and salts thereof, and 2,2'-azobis[N-(2-carboxyethyl)-2-methylpropionamidine]; and an organic peroxide, such as benzoyl peroxide, cumene hydroperoxide, t-butyl hydroperoxide, t-butylperoxy-2-ethyl hexanoate, and t-butylperoxy isobutyrate. These initiators may be used singly, or in combination of two or more kinds thereof.

In the present invention, a redox polymerization reaction may be carried out by further adding a reducing agent. Preferable examples of a radical polymerization method according to the present invention include a method by which polymerization is carried out using a water-soluble initiator, and a method by which polymerization is carried out based on a redox reaction using an organic peroxide as an initiator, and ferrous sulfate, isoascorbic acid, or the like as a reducing agent.

In conducting a polymerization reaction, a known chain transfer agent, such as n-dodecyl mercaptan, t-dodecyl mercaptan, and an α-methyl styrene dimer, may be used as a molecular weight regulator.

When the polymerization reaction is completed, and then cooled down, and an aqueous resin dispersion is collected, it is preferable to carry out a filtration operation in order to prevent contamination with foreign matters or cullet. As for the filtration method, a known method may be used. For example, a nylon mesh, a bag filter, a filter paper, a metal mesh, or the like may be used.

<Aqueous Olefinic Resin Dispersion (ID)>

In the present invention, the aqueous olefinic resin dispersion (ID) is a resin dispersion in which the olefin polymer (A) and the polymer (IC) are dispersed in an aqueous medium.

The aqueous medium means water and/or a solvent other than water. Examples of a solvent other than water include methyl ethyl ketone, cyclohexanone, n-propanol, isopropanol, n-butanol, isobutanol, t-butanol, cyclohexanol, tetrahydrofuran, 2-methoxyethanol, 2-ethoxyethanol, 2-butoxyethanol, 2-methoxypropanol, and 2-ethoxypropanol. These may be used singly, or in combination of two or more kinds thereof.

The aqueous resin dispersion (ID) may be any of aqueous resin dispersions, in which an olefin polymer (A) and a polymer (IC) containing a constituent unit derived from a radically polymerizable monomer (IB) are dispersed in an aqueous medium. Therefore, the aqueous resin dispersion may be an aqueous resin dispersion in which the olefin polymer (A) and the polymer (1C) are dispersed as separate particles, or an aqueous resin dispersion in which particles containing the olefin polymer (A) and the polymer (IC) in a single particle are dispersed. From the viewpoint of particle stability of the aqueous resin dispersion, the latter is preferable.

In the present invention, the contents (mass ratio of the solid components) of an olefin polymer (A) and a polymer (IC) in an aqueous resin dispersion (ID) are: Olefin polymer (A):Polymer (IC)=10:90 to 90:10. The ratio is preferably: Olefin polymer (A):Polymer (IC)=20:80 to 90:10, and more preferably: Olefin polymer (A):Polymer (IC)=30:70 to 90:10. When the proportion of the olefin polymer (A) is smaller than the above lower limit value, the adhesion to a polypropylene base material tends to decrease. When the proportion of the olefin polymer (A) is larger than the above upper limit value, the mechanical stability tends to decrease. The content of the polymer (IC) contained in the aqueous resin dispersion (ID) means the total content of the respective monomers constituting the polymer (IC).

An aqueous resin dispersion (ID) may contain a surfactant for purpose of improving the storage stability. As the surfactant, various anionic, cationic, or nonionic surfactants, or polymeric surfactants can be used. Furthermore, a so-called reactive surfactant having an ethylenic unsaturated bond in the surfactant component can also be used. Among these, from the viewpoint of improving the storage stability of the resultant aqueous resin dispersion, it is preferable to use an anionic surfactant. There is no particular restriction on the anionic surfactant, and for example ADEKA REASOAP SR (trade name, produced by Adeka Corporation), which is a reactive surfactant, and NEOCOL SW-C (trade name, produced by Dai-Ichi Kogyo Seiyaku Co., Ltd.), which is a nonreactive surfactant, can be used.

The surfactant (solid component) is preferably contained at a proportion of 3 parts by mass or less with respect to 100 parts by mass (solid component) of a polymer (IC), and a proportion of 2 parts by mass or less is more preferable. When the content of a surfactant is 3 parts by mass or less, the storage stability of an aqueous resin dispersion is improved. Meanwhile, when the proportion of the contained surfactant is 2 parts by mass or less, the stability when used for a coating composition can be maintained without impairing the water resistance.

[Method for Producing Aqueous Resin Dispersion (ID)]

There is no particular restriction on the method for producing an aqueous resin dispersion (ID), and examples thereof include a method by which a radically polymerizable monomer including a radically polymerizable monomer (IB) is polymerized in an aqueous resin dispersion of an olefinic polymer (A) to yield a polymer (IC), and a method by which an olefinic polymer (A) and a radically polymerizable monomer including a radically polymerizable monomer (IB) are dissolved to form an aqueous resin dispersion, and then polymerized. From the viewpoint of the polymerizability of the radically polymerizable monomer, the former is preferable.

A more preferable method for producing an aqueous resin dispersion (ID) is a method by which 80 to 100 mass % of a radically polymerizable monomer (TB) and a vinyl type monomer are charged at one time in the presence of an aqueous dispersion of an olefinic polymer (A), and polymerized using a water-soluble initiator, or a method by which the polymerization is carried out with a redox initiator using an organic peroxide and a reducing agent such as sodium thiosulfate.

As the initiator, those generally used for radical polymerization may be used. Specific examples thereof include a persulfate, such as potassium persulfate, sodium persulfate, and ammonium persulfate; an oil-soluble azo compound, such as azobis(isobutyronitrile), 2,2'-azobis(2-methylbutyronitrile), 2,2'-azobis(2,4-dimethylvaleronitrile), 2,2'-azobis (4-methoxy-2,4-dimethylvaleronitrile), and 2-phenylazo-4-methoxy-2,4-dimethylvaleronitrile; an water-soluble azo compound, such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-yl)propane] and salts thereof, 2,2'-azobis[2-(2-imidazolin-2-yl)propane] and salts thereof, 2,2'-azobis{2-[1-(2-hydroxyethyl)-2-imidazolin-2-yl]propane} and salts thereof, 2,2'-azobis(2-methylpropionamidine) and salts thereof, and 2,2'-azobis[N-(2-carboxyethyl)-2-methylpropionamidine]; and an organic peroxide, such as benzoyl peroxide, cumene hydroperoxide, t-butyl hydroperoxide, t-butylperoxy-2-ethyl hexanoate, and t-butylperoxy isobutyrate. These initiators may be used singly, or in combination of two or more kinds thereof.

In the present invention, the polymerization temperature is preferably 50° C. or more from the viewpoint of the attainable polymerization rate of an aqueous resin dispersion. In this case, it is preferable to use as an initiator a reducing agent, such as sodium bisulfite, ferrous sulfate, an isoascorbate, and Rongalite in combination with a water-soluble radical polymerization catalyst.

The polymerization time is preferably 30 min or longer. When the polymerization time is less than 30 min, a radically polymerizable monomer does not sufficiently polymerize, and the polymerization rate tends to be inferior. However, the polymerization time is preferably 3 hours or less. When the polymerization time exceeds 3 hours, a large amount of cullet is generated at the time of polymerization, and the production stability tends to be inferior.

Further, in the present invention, in conducting a polymerization reaction, a known chain transfer agent, such as n-dodecyl mercaptan, t-dodecyl mercaptan, and an α-methyl styrene dimer, may be used as a molecular weight regulator.

When the polymerization reaction is completed, and then cooled down, and an aqueous resin dispersion is collected, it is preferable to carry out filtration in order to prevent contamination with foreign matters or cullet. As for the filtration method, a known method may be used. For example, a nylon mesh, a bag filter, a filter paper, a metal mesh, or the like may be used.

An aqueous resin dispersion (D) and an aqueous resin dispersion (ID) of the present invention can be used as a compatibilizer, or the like between a primer, a coating material, an adhesive, an ink binder, and a polyolefin, and a different material, and are particularly useful for a coating material, an adhesive, or an ink binder. Examples of the applications thereof may include an automobile coating material for an automotive interior or exterior, a coating material for household appliances, such as a mobile phone, and a personal computer, a coating material for a building material, and a heat sealant. Among these, they are particularly preferable for a primer coating material for a plastic base material, especially for a polypropylene base material.

In a case where an aqueous resin dispersion according to the present invention is used for a coating material, the constituent of the coating composition may optionally contain, in addition to an aqueous resin dispersion obtained by the present invention, various additives, such as an inorganic filler, resin beads, a film forming aid, a base material wetting agent, a base material humectant, an acrylic resin, a urethane resin, a polyester resin, a colorant, a defoaming agent, and a thickener. As such additives, those known may be used.

Further, for purpose of increasing the drying speed, or forming a surface exhibiting nice finish feeling, the coating composition may contain an organic solvent as a film forming aid. Examples of the organic solvent include an alcohol, such as methanol, ethanol and isopropanol; a ketone, such as acetone; a glycol, such as ethylene glycol, propylene glycol, ethylene glycol monobutyl ether, diethylene glycol monobutyl ether, propylene glycol monomethyl ether, and ethers thereof.

EXAMPLES

The present invention will be described below in more detail by way of Examples and Comparative Examples. "Parts" and "%" in Examples represent "parts by mass" and "mass %," respectively. Each evaluation on aqueous resin dispersions was carried out by the following method.

<Evaluation of Aqueous Resin Dispersion>

1. Initial Adhesion (Preparation of Coating Material)

To the solid component of an aqueous resin dispersion, 60 parts of diethylene glycol monobutyl ether as a film forming aid, and 3 parts each of TEGO® WET KL-245 (trade name, produced by Evonik Industries AG) as a base material wetting agent, and BYK-345 (trade name, produced by BYK Japan KK) were added, and the mixture was stirred using a homogenizer (trade name: POLYTRON PT-3100, produced by Central Scientific Commerce, Inc.) at 700 rpm for 5 min. Left standing at room temperature for 1 day, then the mixture was filtrated with a 300 mesh screen to obtain a water-based coating material.

Next, the surface of a 3 mm-thick substrate molded from a polypropylene resin (trade name: TSOP-6, produced by Japan Polypropylene Corp.) was cleaned with isopropyl alcohol. The obtained water-based coating material was sprayed on the substrate such that the dry film thickness became 20 μm, allowed to set at room temperature for 10 min, and then dried in a safe vent dryer in an atmosphere of 80° C. for 30 min to form a coating film. This was left standing at room temperature for 1 day to obtain a test piece.

Then, on the coating film side of the test piece, 11 cross-cuts deep enough to reach the base material were made at intervals of 1 mm in both length and width directions to make 100 cross-cut squares. Then, after sticking a cellophane adhesive tape over the cross-cut squares, the adhesive tape was peeled abruptly, and the resultant condition of the coating film was observed, and the number of squares where the coating film was detached (detached squares) was counted. The initial adhesion was evaluated based on the following rating criteria.

○ (Excellent): 0 to 9 detached squares out of 100 squares
Δ (Average): 10 to 19 detached squares out of 100 squares
× (Bad): 20 to 100 detached squares out of 100 squares 2. Water Resistance (Mass Decrement)

The surface of a glass substrate was cleaned with isopropyl alcohol. The obtained aqueous resin dispersion was coated on the glass substrate such that the dry film thickness became 100 μm. The plate was dried in a safe vent dryer in an atmosphere of 90° C. for 30 min to form a coating film. This was left standing at room temperature for 1 day and the coating film was peeled from the glass substrate to obtain a test piece.

The prepared test piece was cut into 10 mm×10 mm and placed in a sample bottle such that the mass (initial mass: W1) became 1 g. After adding 100 mL of water to the sample bottle, the bottle was stored at 40° C. for 10 days in a thermostat. After the storage, the test piece was taken out and the mass (mass after 10 days at 40° C.: W2) was measured, and the mass decrement was calculated by the following calculation formula.

$$\text{Mass decrement (mass \%)} = [(W1(g) - W2(g))/W1(g)] \times 100$$

○ (Excellent): Mass decrement is 2.0 mass % or less
Δ (Average): Mass decrement is 2.1 mass % or more and 3.0 mass % or less
× (Bad): Mass decrement is 3.1 mass % or more 3. Solvent Stability To an aqueous resin dispersion of the present invention, 20 mass % of 2-ethylhexanol with respect to the solid component of the aqueous resin dispersion was added, and the mixture was stirred using a homogenizer (trade name: POLYTRON PT-3100, produced by Central Scientific Commerce, Inc.) for 5 min. With respect to the obtained aqueous resin dispersion, presence or absence of aggregates was examined with a grind gauge. The solvent stability was evaluated according to the following rating criteria. This solvent stability indicates the dispersion stability of an aqueous resin dispersion.

○ (Excellent): No aggregate.
Δ (Average): Aggregates are formed, but solidification did not occur.
× (Bad): Solidification occurred.

4. Observation of Particle Structure of Aqueous Resin Dispersion

An aqueous resin dispersion was added to an agarose gel dissolved in a hot water bath, and the mixture was cooled to solidify, then cut into a size of about 1 mm cube, and the impregnated water was replaced with an epoxy resin. Subsequently, the mixture was polymerized and cured in a gelatin capsule, and an ultrathin section having a thickness of 70 nm was prepared with an ultramicrotome. Observation was performed on the obtained ultrathin section using a transmission electron microscope (trade name: H-7600, produced by Hitachi High-Technologies Corp.) at an acceleration voltage of 80 kV.

<Production of Aqueous Resin Dispersion (D)>

Example 1

Into a flask equipped with a stirrer, a reflux condenser, and a temperature controller were charged 336.7 parts of APTOLOK® BW-5683 (produced by Mitsubishi Chemical Corporation: solid component 29.6%) as an olefin polymer (A), 119.6 parts of deionized water, and 8.0 parts of ADEKA REASOAP SR-1025 (trade name, produced by Adeka Corporation: solid component 25%) as a surfactant, and the temperature thereof was raised to 30° C.

Next, 5.2 parts of 2-hydroxypropyl methacrylate as a radically polymerizable monomer (B), and 94.8 parts of butyl acrylate as another vinyl type monomer were added, and the temperature was raised to 60° C. and held for 1 hour. Further, 0.02 parts of PERBUTYL® H69 (trade name, produced by NOF Corporation, solid component 69%) as an initiator, 0.0002 parts of ferrous sulfate as a reducing agent, 0.00027 parts of ethylenediaminetetraacetic acid (EDTA), 0.08 parts of sodium isoascorbate monohydrate, and 1 part of deionized water were added, and polymerization was initiated.

After detecting an exothermic peak of polymerization, 0.03 parts of PERBUTYL® H69, and 10.0 parts of deionized water were added dropwise over 15 min. After completion of drop-wise addition, ripening was carried out at 60° C. for 30 min to obtain an aqueous resin dispersion (D). With respect to the obtained aqueous resin dispersion, the initial adhesion, water resistance, and solvent stability were evaluated. The evaluation results are shown in Table 1. All the expressions of parts by mass in Table 1 refer to the parts by mass of a solid component.

Example 2

Into a flask equipped with a stirrer, a reflux condenser, and a temperature controller were charged 336.7 parts of APTOLOK® BW-5683 (produced by Mitsubishi Chemical Corporation: solid component 29.6%) as an olefin polymer (A), 119.6 parts of deionized water, and 8.0 parts of ADEKA REASOAP SR-1025 (trade name, produced by Adeka Corporation: solid component 25%) as a surfactant, and the temperature thereof was raised to 30° C.

Next, 10.4 parts of 2-hydroxypropyl methacrylate as a radically polymerizable monomer (B), and 89.6 parts of butyl acrylate as another vinyl type monomer were added, and the temperature was raised to 60° C. and held for 1 hour. Further, 0.02 parts of PERBUTYL® H69 (trade name, produced by NOF Corporation, solid component 69%) as an initiator, 0.0002 parts of ferrous sulfate as a reducing agent, 0.00027 parts of ethylenediaminetetraacetic acid (EDTA), 0.08 parts of sodium isoascorbate monohydrate, and 1 part of deionized water were added, and polymerization was initiated.

After detecting an exothermic peak of polymerization, 0.03 parts of PERBUTYL® H69, and 10.0 parts of deionized water were added dropwise over 15 min. After completion of drop-wise addition, ripening was carried out at 60° C. for 30 min to obtain an aqueous resin dispersion (D). With respect to the obtained aqueous resin dispersion, the initial adhesion, water resistance, and solvent stability were evaluated. The evaluation results are shown in Table 1.

When the particle structure of the obtained aqueous resin dispersion (D) was analyzed using a certain transmission electron microscope, a particle containing the olefin polymer (A) and the polymer (C) was observed.

Examples 3 to 6, and Comparative Examples 1 and 2

An aqueous resin dispersion was obtained in the same manner as in Example 1 except that the radically polymerizable monomer (B), other vinyl type monomer, and surfactant as well as the contents thereof were changed as set forth in Table 1. With respect to the obtained aqueous resin dispersion, the initial adhesion, water resistance, and solvent stability were evaluated. The evaluation results are shown in Table 1.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Olefin polymer (A) parts by mass | APTOLOK BW-5683 | 100 | 100 | 100 | 100 | 100 | 100 | 100 | 100 |
| Radically polymerizable monomer (B) parts by mass | HPMA | 5.2 | 10.4 | 20.8 | | | | | |
| | 4HBA | | | | 0.6 | 10.4 | 20.8 | | |
| Vinyl type monomer parts by mass | HEMA | | | | | | | 9.7 | |
| | HEA | | | | | | | | 8.2 |
| | BA | 94.8 | 89.6 | 79.2 | 99.4 | 89.6 | 79.2 | 90.3 | 91.8 |
| Surfactant parts by mass | ADEKA REASOAP SR-1025 | 2 | 2 | 2 | 2 | 2 | 2 | 2 | 2 |
| Hydroxyl value of polymer (C) | mgKOH/g | 20 | 40 | 80 | 2.2 | 40 | 80 | 40 | 40 |
| Evaluation of aqueous resin dispersion (D) | Initial adhesion | ○ | ○ | ○ | ○ | ○ | ○ | X | X |
| | (Detached squares/Total squares) | 0/100 | 0/100 | 0/100 | 0/100 | 0/100 | 0/100 | 20/100 | 20/100 |
| | Water resistance test | ○ | ○ | ○ | ○ | ○ | ○ | ○ | X |
| | (Mass decrement) | 2.0% | 1.8% | 2.0% | 2.0% | 1.2% | 1.8% | 1.8% | 3.2% |
| | Solvent stability | ○ | ○ | ○ | ○ | ○ | ○ | ○ | ○ |

Abbreviations in Table 1 represent respectively the following compounds.

HPMA: 2-Hydroxypropyl methacrylate

4-Hydroxybutyl acrylate

HEMA: 2-Hydroxyethyl methacrylate

HEA: 2-Hydroxyethyl acrylate

BA: Butyl acrylate

As shown in Table 1, each of the aqueous resin dispersions according to Examples 1 to 6 of the present invention includes an olefin polymer (A), and a polymer (C) containing a constituent unit derived from a radically polymerizable monomer (B) wherein R in the general formula (1) is a hydrogen atom or a methyl group, X is a straight chain or branched alkylene group having 3 or 4 carbon atoms, and n is 1. Further, since in each of the aqueous resin dispersions, particles containing both the olefin polymer (A) and the polymer (C) are dispersed, the obtained coating film was superior in initial adhesion and water resistance.

On the other hand, each of the aqueous resin dispersions according to Comparative Examples 1 and 2 includes as a radically polymerizable monomer (B) a vinyl type monomer in which X in the general formula (1) is a straight chain alkyl group having 2 carbon atoms, and therefore the obtained coating film was inferior in initial adhesion.

Production of Aqueous Olefinic Resin Dispersion (ID)

Example 7

Into a flask equipped with a stirrer, a reflux condenser, and a temperature controller were charged 333.3 parts of APTOLOK BW-5635 (trade name, produced by Mitsubishi Chemical Corporation: solid component 30.0%) as an olefin polymer (A), 119.6 parts of deionized water, and 8.0 parts of ADEKA REASOAP SR-1025 (trade name, produced by Adeka Corporation: solid component 25%) as a surfactant, and the temperature thereof was held at 30° C.

Next, 0.5 parts of methacrylic acid as a radically polymerizable monomer (IB), and 10.4 parts of 4-hydroxybutyl acrylate, 44.6 parts of isobutyl methacrylate, and 44.6 parts of butyl acrylate as vinyl type monomers were added, and the temperature was held at 50° C. for 1 hour.

Further, 0.02 parts of PERBUTYL® H69 (trade name, produced by NOF Corporation) as an initiator, 1.0 parts of deionized water, 0.002 parts of iron sulfate heptahydrate, 0.00027 parts of ethylenediaminetetraacetic acid, and 0.08 parts of sodium erythorbate were added, and polymerization was initiated.

After detecting an exothermic peak of polymerization, 0.03 parts of PERBUTYL H69, and 10.0 parts of deionized water were added dropwise over 15 min. After completion of drop-wise addition, ripening was carried out at 60° C. for 30 min, and then the system were cooled down to 30° C. Thereafter, 0.5 parts by mass of dimethylethanolamine was added, and the system was stirred for 30 min to be neutralized. In this way, an aqueous resin dispersion (ID) having an average particle diameter of 150 nm was obtained. With respect to the obtained aqueous resin dispersion, the initial adhesion, and solvent stability were evaluated. The evaluation results are shown in Table 2. All the expressions of parts by mass in Table 2 refer to the parts by mass of a solid component.

Examples 8 to 14

An aqueous resin dispersion was obtained in the same manner as in Example 7 except that the contents of the radically polymerizable monomer (IB), vinyl type monomer, surfactant and amine with respect to olefin polymer (A) was changed as set forth in Table 2. With respect to the obtained aqueous resin dispersion, each evaluation was carried out in the same manner as in Example 7. The evaluation results are shown in Table 2.

Abbreviations in Table 2 represent respectively the following compounds.
MAA: Methacrylic acid
AA: Acrylic acid
iBMA: Isobutyl methacrylate
DMEA: Dimethylethanolamine

TABLE 2

| | | Example 7 | Example 8 | Example 9 | Example 10 | Example 11 | Example 12 | Example 13 | Example 14 |
|---|---|---|---|---|---|---|---|---|---|
| Olefin polymer (A) parts by mass | APTOLOK BW-5635 | 100 | 100 | 100 | 100 | 100 | 100 | 100 | 100 |
| Radically polymerizable monomer (IB) parts by mass | MAA | 0.5 | 1 | 0.5 | 0.75 | 1 | — | — | 0.1 |
| | AA | — | — | — | — | — | 0.8 | — | — |
| Vinyl type monomer parts by mass | 4HBA | 10.4 | 10.4 | 10.4 | 10.4 | 10.4 | 10.4 | 10.4 | 10.4 |
| | iBMA | 44.6 | 44.1 | 65 | — | — | — | 44.8 | 44.8 |
| | BA | 44.6 | 44.6 | 24 | 88.8 | 88.6 | 88.8 | 44.8 | 44.8 |
| Surfactant parts by mass | ADEKA REASOAP SR-1025 | 2 | 2 | 2 | 2 | 2 | 2 | 2 | 2 |
| Amine parts by mass | DMEA | 0.5 | 1.0 | 0.5 | 0.78 | 1.0 | 1.0 | — | 0.1 |
| Acid value of polymer (IC) | mgKOH/g | 3.3 | 6.5 | 3.3 | 4.9 | 6.5 | 6.2 | 0 | 0.7 |
| Evaluation of aqueous resin dispersion (ID) | Initial adhesion | ○ | ○ | ○ | ○ | ○ | ○ | ○ | ○ |
| | (Detached squares/Total squares) | 0/100 | 0/100 | 0/100 | 0/100 | 0/100 | 0/100 | 0/100 | 0/100 |
| | Solvent stability | ○ | ○ | ○ | ○ | ○ | ○ | X | X |

As shown in Table 2, with respect to any of the aqueous resin dispersions according to Examples 7 to 12 of the present invention, the acid value of the polymer (IC) containing a constituent unit derived from a radically polymerizable monomer (IB) was from 1 to 9 mg KOH/g, and therefore it was excellent in initial adhesion and solvent stability. However, with respect to any of the aqueous resin dispersions according to Examples 13 and 14, the acid value of the polymer (IC) containing a constituent unit derived from a radically polymerizable monomer (IB) was low, and therefore it was inferior to the aqueous resin dispersions according to Examples 7 to 12 in solvent stability.

The invention claimed is:

1. An aqueous resin dispersion (D), comprising:
   an olefin polymer (A), and
   a polymer (C) dispersed in an aqueous medium,
   wherein the polymer (C) comprises a constituent unit derived from a radically polymerizable monomer (B) represented by the following general formula (1)

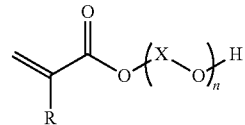

(1)

wherein R is a hydrogen atom or a methyl group, X is a straight chain or branched alkylene group having 3 to 5 carbon atoms, and n is an integer of 1 to 20, and
wherein the polymer (C) is a polymer obtained by polymerizing the radically polymerizable monomer (B) with an additional vinyl monomer other than the radically polymerizable monomer (B),
wherein the additional vinyl monomer is selected from the group consisting of a (meth)acrylic monomer, an aromatic monomer, an amide monomer, (meth)acrylonitrile, vinyl acetate, vinyl propionate, and vinyl versatate,
wherein the polymer (C) has a hydroxyl value of 1 to 200 mg KOH/g, and wherein a ratio (solid component, (C)/(A)) of the polymer (C) and the olefinic polymer (A) contained in the aqueous resin dispersion (D) is from 0.5 to 2.

2. The aqueous resin dispersion according to claim 1, wherein n in the general formula (1) is 1.

3. The aqueous resin dispersion according to claim 1, wherein particles comprising the olefin polymer (A) and the polymer (C) are dispersed in the aqueous medium.

4. The aqueous resin dispersion according to claim 1, wherein a proportion of the constituent unit derived from a radically polymerizable monomer (B) contained in the polymer (C) is from 0.01 to 50 mass % of the polymer (C).

5. The aqueous resin dispersion according to claim 1, wherein the olefin polymer (A) does not contain a chlorine atom.

6. The aqueous resin dispersion according to claim 1, wherein the additional vinyl monomer is selected from the group consisting of (meth)acrylic acid, (meth)acrylic acid ester, styrene, α-methyl styrene, (meth)acrylamide, dimethyl (meth)acrylamide, (meth)acrylonitrile, vinyl acetate, vinyl propionate, and vinyl versatate.

7. The aqueous resin dispersion according to claim 1, wherein the additional vinyl monomer is selected from the group consisting of isobutyl methacrylate, t-butyl methacrylate, butyl acrylate, styrene, and cyclohexyl methacrylate.

8. The aqueous resin dispersion according to claim 1, wherein the additional vinyl monomer is butyl acrylate.

* * * * *